(12) United States Patent
Schonlau

(10) Patent No.: US 7,891,272 B2
(45) Date of Patent: Feb. 22, 2011

(54) ROBOTIC HARMONIC FLEX-DRIVE

(76) Inventor: William J. Schonlau, 31107 Marne Dr., Rancho Palos Verdes, CA (US) 90275

( * ) Notice: Subject to any disclaimer, the term of this patent is extended or adjusted under 35 U.S.C. 154(b) by 743 days.

(21) Appl. No.: 11/940,170

(22) Filed: Nov. 14, 2007

(65) Prior Publication Data

US 2008/0110287 A1 May 15, 2008

Related U.S. Application Data

(60) Provisional application No. 60/865,782, filed on Nov. 14, 2006.

(51) Int. Cl.
*F16H 1/32* (2006.01)
(52) U.S. Cl. ..................................... 74/640
(58) Field of Classification Search .................. 74/640
See application file for complete search history.

(56) References Cited

U.S. PATENT DOCUMENTS

| | | | | |
|---|---|---|---|---|
| 2,906,143 | A | | 9/1959 | Musser |
| 3,415,144 | A | * | 12/1968 | Carson ..................... 74/640 |
| 3,427,898 | A | * | 2/1969 | Mayer ..................... 74/640 |
| 3,496,782 | A | * | 2/1970 | Carlson et al. ............. 74/10.8 |
| 3,977,275 | A | | 8/1976 | Kiesewetter et al. |
| 4,237,751 | A | | 12/1980 | Davis |
| 4,703,670 | A | | 11/1987 | Kondo |
| 2001/0052735 | A1 | * | 12/2001 | Sakamoto ............... 310/75 R |
| 2003/0121363 | A1 | * | 7/2003 | Poehlau ..................... 74/640 |

* cited by examiner

*Primary Examiner*—David D Le
*Assistant Examiner*—Erin D Bishop
(74) *Attorney, Agent, or Firm*—Kelly Lowry & Kelley, LLP

(57) ABSTRACT

A robotic harmonic flex-drive has an outer generally cylindrical spline having inner diameter gear teeth and an inner generally cylindrical spline having outer diameter gear teeth concentric to the outer spline. A wave generator including a pair of rollers disposed adjacent to an outside surface of the outer spline and an inner surface of the inner spline deforms the outer and inner splines into ellipses whereby the inner diameter gear teeth of the outer spline engage the outer diameter gear teeth of the inner spline at a pair of diametrically opposed points along a major axis of the deformed outer and inner splines.

20 Claims, 8 Drawing Sheets

ROBOTIC HARMONIC FLEX-DRIVE

BACKGROUND OF THE INVENTION

The present invention is generally directed to a mechanical system having a rotary drive speed-torque conversion device. More particularly, the present invention is directed to a robotic harmonic flex-drive.

Conventional modular robotic systems enable single degree-of-freedom rotary joint modules in arrangements suited for specific automation tasks. Each joint module contains a control processor, a drive motor and a speed reduction gear mechanism. These devices all work together in coordination with other joints to move a payload along a specified trajectory with precisely controlled position, velocity and torque. The reduction gear mechanism has previously been provided by commercial harmonic drive assemblies and is illustrated in FIGS. 1, 2 and 3A-3C. Several important properties of such a harmonic drive assembly includes small size, moderate weight, high efficiency, zero backlash, and high torque.

FIGS. 1, 2 and 3A-3C illustrate a conventional harmonic drive assembly 10 which includes three major components: a circular spline 12; a flex spline 14; and a wave generator 16. The circular spline 12 is a rigid circular structure with a set of gear teeth 18 disposed along the inside diameter of the circular spline 12. The flex spline 14 is a cup-shaped structure with a set of gear teeth 20 around an upper outside surface 22 of the flex spline 14. As shown in FIG. 2, the flex spline 14 further includes a tube 24, a diaphragm 26 and a flange 28. The wave generator 16 is an elliptical ball bearing assembly having a plurality of ball bearings 30, a hub 32, a plug 34 and an Oldham coupling 36. The flex spline 14 is positioned coaxially inside of the circular spline 12, which has a larger inside diameter than the outside diameter of the flex spline 14. The circular spline 12 has two more gear teeth 18 relative to the quantity of gear teeth 20 of the flex spline 14.

The elliptical wave generator 16 is also positioned on a common axis 38 with the circular spline 12 and the flex spline 14. The wave generator 16 fits inside the flex spline 14 and has a major axis width 40 (FIGS. 3A-3C) sufficient to deflect an upper edge 42 and a lower edge 44 of the flex spline 14 outward, causing the outside gear teeth 20 of the flex spline 14 to engage the inside gear teeth 18 of the circular spline 12 at two diametrically opposite contact points 46, 48. The wave generator 16 is typically driven by an electric motor, not shown. Rotation of the wave generator 16 causes simultaneous rotation of the flex spline 14 and the engaged circular spline 12 via the engaged gear teeth 18, 20. Although, the flex spline 14 and the wave generator 16 rotate at different speeds relative to one another. The difference between the quantity of the inside gear teeth 18 of the circular spline 12 relative to the outside gear teeth 20 of the flex spline 14 causes a rotational displacement between the circular spline 12 and the flex spline 14. In general, for a circular spline 12 that has N inner gear teeth 18, the wave generator 16 needs to rotate N/2 times to cause one complete rotation of the flex spline 14. Thus, the conventional harmonic drive assembly 10 provides a speed reduction of N/2 from the wave generator 16 to the flex spline 14. Such a reduction in speed induces a corresponding increase in torque within the harmonic drive assembly 10.

The core principle of operation of the conventional harmonic drive assembly 10 derives from the deformed cylindrical geometry of the flex spline 14, not from the engagement of the inside gear teeth 18 of the circular spline 12 with the outside gear teeth 20 of the flex spline 14. The engagement of the gear teeth 18, 20 only serves to prevent slippage to prolong the life span of the harmonic drive assembly 10 and to provide more efficient operation. The degree of deflection in the flex spine 14 as illustrated in FIGS. 3A-3C is exaggerated to demonstrate the operation of the harmonic drive assembly 10. The actual deflection is much smaller than shown and is well within the material fatigue limits for infinite service life. As shown in FIG. 3A, the elliptical wave generator 16 deflects the upper edge 42 of the flex spline 14 such that the outside gear teeth 20 of the flex spline 14 engage the inside gear teeth 18 of the circular spline 12 along the major axis 40 at the diametrically opposed contact points 46, 48. The inside gear teeth 18 of the circular spline 12 are fully disengaged from the outside gear teeth 20 of the flex spline 14 along a minor axis 50. Most of the relative motion between the inside gear teeth 18 and the outside gear teeth 20 occurs along the minor axis 50. The rigid circular spline 12 is commonly rotationally fixed. FIGS. 3B and 3C illustrate rotation of the wave generator 16 by ninety and one hundred eighty degrees, respectively. An example of a conventional harmonic drive assembly is illustrated in U.S. Pat. No. 2,906,143 to Musser.

The primary failure mechanism of the conventional harmonic drive assembly 10 derives from the rigidity of the circular spline 12, which, under heavy load, deforms enough to allow gear tooth slippage. Slippage also increases the risk of backlash. Gear slippage is therefore often destructive to the gear teeth 18, 20. This problem has been addressed by increasing the thickness of the circular spline 12. Consequently, and undesirably, increased thickness significantly increases the weight and size of the entire harmonic drive assembly 10. Additionally, increased thickness increases the cost of the components, which are already expensive to fabricate. These additional costs significantly increase the manufacturing cost of the entire robotic arm assembly.

Accordingly, there is a need for a harmonic drive assembly that significantly improves on the prior art described above. Such a harmonic drive assembly should improve on properties that include, without limitation, small size, moderate weight, high efficiency, zero backlash, high torque and the like. Such a harmonic drive assembly should include an inner spline with outside gear teeth and an outer spline with inside gear teeth that are engaged by a rotational wave generator having multiple roller bearings for deflecting the splines together. Accordingly, such a harmonic drive assembly can be smaller in size, have decreased weight, have an increased efficiency, include zero backlash, and be capable of receiving higher torques without risk of failure. The present invention fulfills these needs and provides other related advantages.

SUMMARY OF THE INVENTION

The present invention for a robotic harmonic flex-drive includes an outer generally cylindrical spline having a plurality of inner gear teeth and an inner generally cylindrical spline having a plurality of outer diameter gear teeth concentric to the outer spline. The robotic harmonic flex-drive also includes a wave generator having a pair of rollers disposed adjacent to an outer surface of the outer spline and an inner surface of the inner spline. The rollers of the wave generator deform the outer and inner splines into ellipses whereby the inner diameter gear teeth of the outer spline engage the outer diameter gear teeth of the inner spline. Accordingly, the inner diameter gear teeth contact the outer diameter gear teeth along a major axis of the deformed outer and inner splines at a pair of diametrically opposed points. The inner diameter gear teeth and the outer diameter gear teeth are disengaged along a minor axis of the deformed outer and inner splines.

The robotic harmonic flex-drive of the present invention further includes a motor for rotating the wave generator about the circumferences of the outer and inner splines. The inner spline rotates at an angular speed relative to the rotational angular speed of the wave generator. The outer spline may be stationary. The quantity of outer diameter gear teeth relative to the quantity of inner diameter gear teeth determines the angular rotational speed of the inner spline relative to the angular rotational speed of the wave generator. When the quantity of outer diameter gear teeth outnumber the quantity of inner diameter gear teeth, the angular rotational speed of the inner spline is relatively slower than the angular rotational speed of the wave generator. The wave generator may further include a second pair of rollers disposed adjacent to an outer surface of the outer spline and an inner surface of the inner spline to further facilitate engagement of the inner diameter gear teeth with the outer diameter gear teeth.

Other features and advantages of the present invention will become apparent from the following more detailed description, when taken in connection with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
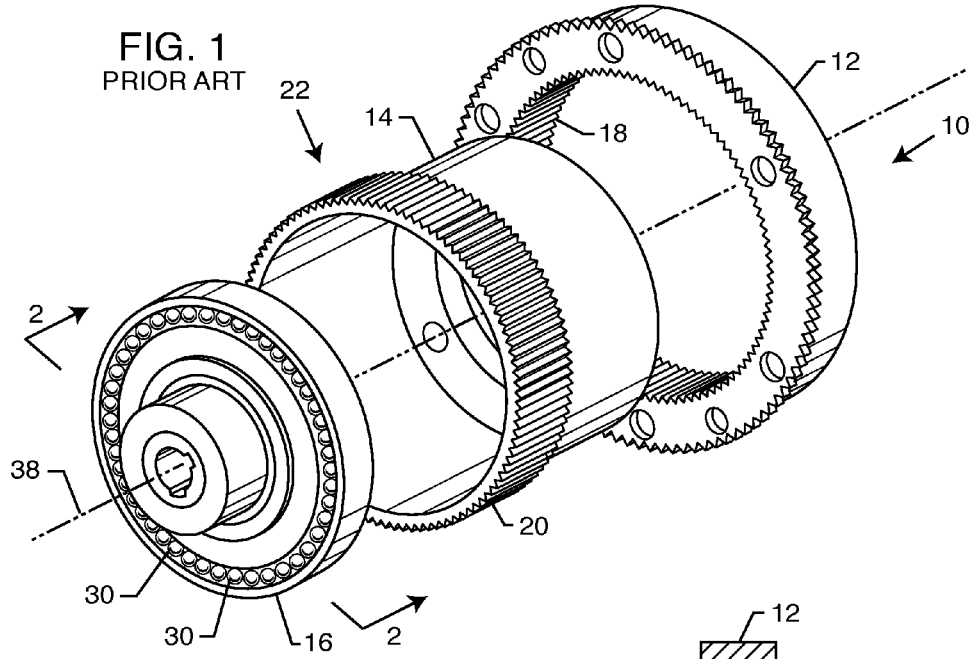
FIG. 1 is an exploded perspective view of a conventional harmonic drive assembly.
Figure 2:
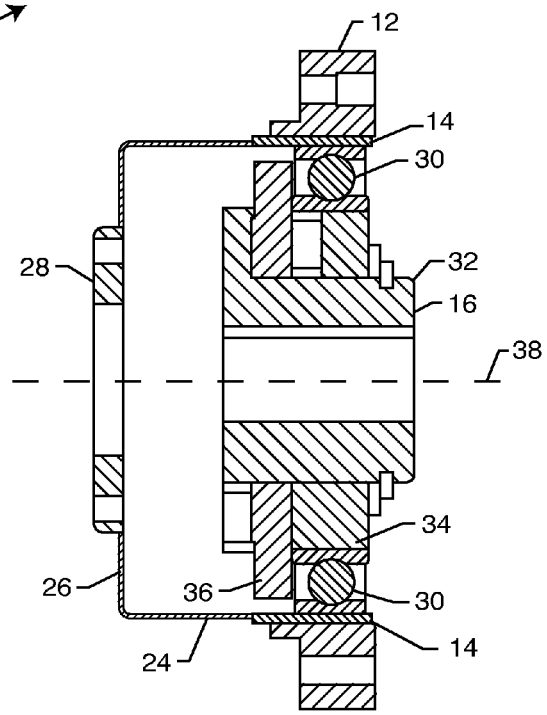
FIG. 2 is a cross-sectional view of the conventional drive assembly of FIG. 1 when assembled, taken along the line 2-2.
Figure 3A:
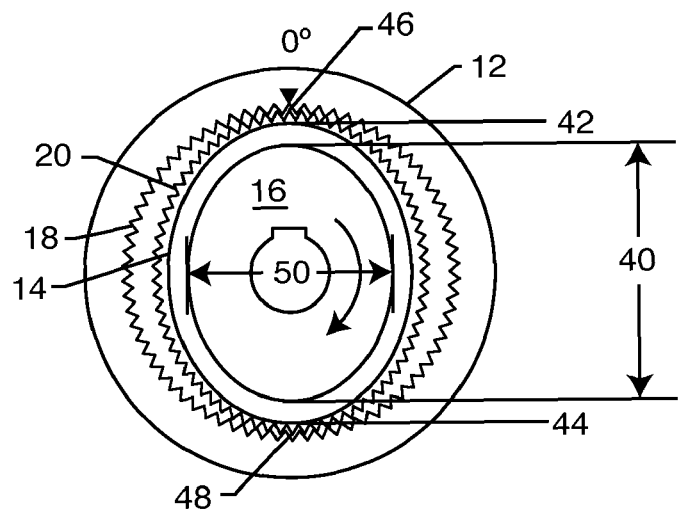
FIGS. 3A-3C illustrate movement of the wave generator and flex spline relative to the stationary circular spline.
Figure 3B:
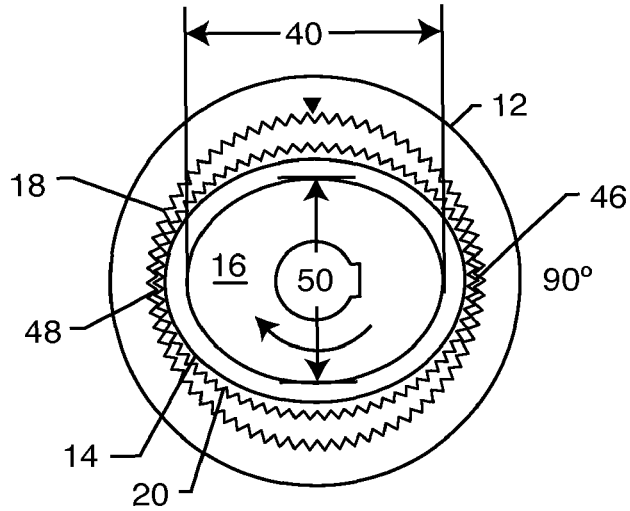
Figure 3C:
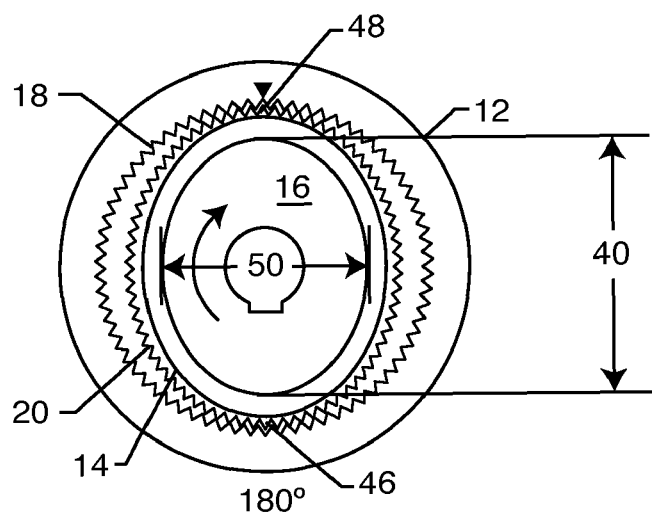
Figure 4:
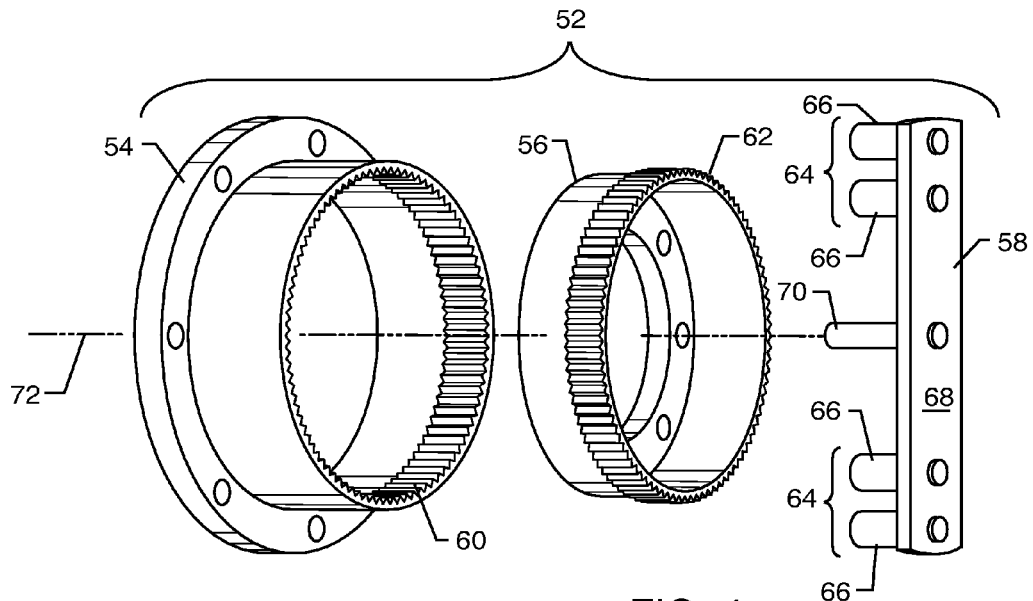
FIG. 4 is an exploded perspective view of the robotic harmonic flex-drive of the present invention.

As shown in the drawings for purpose of illustration, the present invention resides in a robotic harmonic flex-drive assembly and is referred to generally by the reference number 52. Turning now to the representative figures in the specification, FIG. 4 illustrates the robotic harmonic flex-drive assembly 52 having an inner spline 56, an outer spline 54 and a wave generator 58. This robotic harmonic flex-drive assembly 52 is particularly advantageous over the prior art for properties that include, without limitation, size, weight, efficiency, backlash, and torque. In particular, the robotic harmonic flex-drive assembly 52 of the present invention is smaller in size, lighter, more efficient, has zero backlash and is capable of withstanding and operating at higher torques than the conventional harmonic drive assembly 10 previously described.

The robotic harmonic flex-drive assembly 52 consists of a mechanical interaction of the wave generator 58 with the inner spline 56 and the outer spline 54. In particular, the outer spline 54 includes a plurality of inner gear teeth 60 and the inner spline 56 includes a plurality of outer gear teeth 62. Both the inner spline 56 and the outer spline 54 are substantially rigid and cylindrical as shown in FIG. 4. But, the wave generator 58 is capable of deforming the inner spline 56 and the outer spline 54 to ensure engagement of the inner gear teeth 60 with the outer gear teeth 62, as described below. The wave generator 58 itself includes a pair of pinchers 64, each including a pair of rollers 66. The pinchers 64 deflect the outer spline 54 inward toward the inner spline 56 and stretch the inner spline 56 outward toward the outer spline 54 between each of the pair of rollers 66. A bar 68 provides a base attachment for each of the rollers 66 and a drive shaft 70 that is mechanically coupled to a motor or other drive unit (not shown). As shown in FIG. 4, the inner spline 56 and the outer spline 54 are positioned coaxially and concentric along with the center of the drive shaft 70 of the wave generator 58 along an axis 72.

Figure 5:
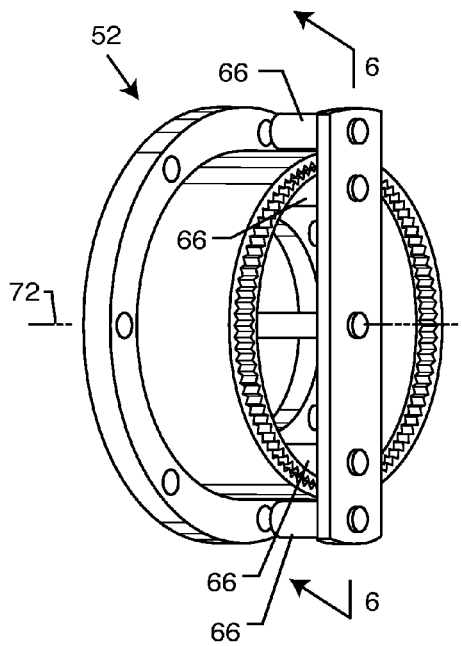
FIG. 5 is a perspective view of the robotic harmonic flex-drive of FIG. 4, illustrating assembly of the outer spline, inner spline and wave generator.
Figure 6:
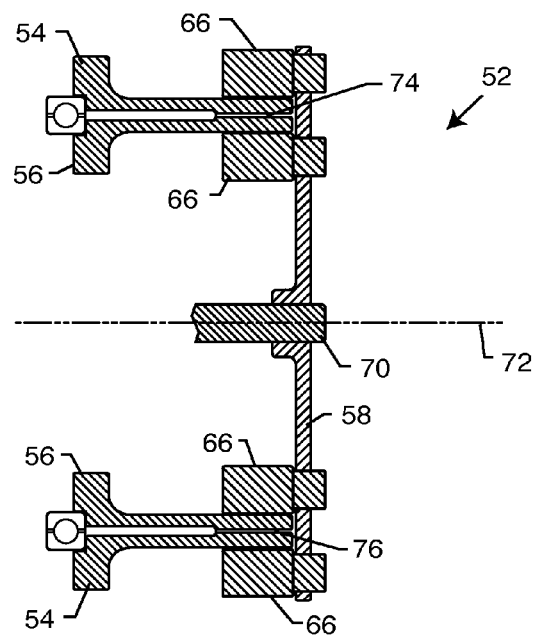
FIG. 6 is a cross-sectional view of the robotic harmonic flex-drive of FIG. 5, taken along the line 6-6.

FIG. 5 illustrates the robotic harmonic flex-drive assembly 52 in an operable configuration. As shown, the inner spline 56 and the corresponding outer gear teeth 62 are located concentric along the axis 72 within the interior of the outer spline 54 and the corresponding inner gear teeth 60. Each one of the pair of rollers 66 pinch the corresponding outer spline 54 toward the inner spline 56 and the inner spline 56 toward the outer spline 54 along the length of the wave generator 58. The cross-sectional view of FIG. 6 best illustrates the function of the rollers 66. As shown, the pair of rollers 66 are spaced to receive the inner spline 56 and the outer spline 54, as deflected toward one another, to allow rotational engagement of the inner gear teeth 60 with the outer gear teeth 62 at a pair of diametrically opposed points 74, 76. Unlike the conventional harmonic drive assembly 10 as previously discussed, the outer spline 54 is not rigid like the circular spline 12. Instead, both the inner spline 56 and the outer spline 54 deflect toward one another as the wave generator 58 rotates about the circumference of both the inner spline 56 and the outer spline 54. Both the inner spline 56 and the outer spline 54 deform approximately the same distance. This deflection causes the inner spline 56 and the outer spline 54 to take on an elliptical shape. The inner spline 56 and outer spline 54 deflect accordingly as the drive shaft 70 rotates the wave generator 58 about the circumference of the inner spline 56 and the outer spline 54.

As compared to the conventional harmonic drive assembly 10, the present invention for the robotic harmonic flex-drive assembly 52 contains several advantages. Pinching the outer spline 54 to the inner spline 56 with the rollers 66 provides equivalent speed reduction and torque displacement performance as the conventional harmonic drive assembly 10. But, there is a significant reduction in the magnitude of deflection with both the inner spline 56 and the outer spline 54. The rigid circular spline 12 of the conventional harmonic drive assembly 10 must maintain a circular shape to ensure proper gear tooth engagement. Small deformation of the rigid circular spline 12 can occur under large loads which, in turn causes slippage because the inside gear teeth 18 and the outside gear teeth 20 are small and have low profiles. The robotic harmonic flex-drive assembly 52 of the present invention addresses this problem by pinching the outer spline 54 to the inner spline 56 with the wave generator 58, a structure that does not need to be rigid over an extended distance. Accordingly, the pair of rollers 66 only transmits this deformation force over a few millimeters so that the amount of material required to convey these forces is much smaller. In addition, both the inner spline 56 and the outer spline 54 deflect toward one another. This significantly decreases the deflection magnitude of the inner spline 56. For manufacturing purposes, this significantly reduces the weight and increases the strength of an ultimately lighter and stronger robotic harmonic flex-drive assembly 52. Moreover, backlash is eliminated as the rollers 66 prevent disengagement between the inner gear teeth 60 and the outer gear teeth 62 at the diametrically opposed engagement points 74, 76. No longer does engagement rely on the strength of the materials and the corresponding gear teeth 18, 20, but rather the ability of the rollers 66 to pinch the inner spline 56 and the outer spline 54. The inner gear teeth 60 and the outer gear teeth 62 of the inner spline 56 and the outer spline 54, respectively, merely provide the proper reduction ratio between the angular velocities of the inner spline 56 and the wave generator 58. In an alternative embodiment, the rollers 66 may be replaced by a low friction (e.g. TEFLON) fork used to deflect the outer spline 54 toward the inner spline 56.

Another advantage of the robotic harmonic flex-drive assembly 52 of the present invention includes the ability to transmit higher torque to supporting structures. Since the wave generator 58 pinches the outer spline 54 to the inner spline 56, the deflection of either the inner spline 56 or the outer spline 54 is substantially smaller. Less deformation relative to the overall cylindrical shape of either the inner spline 56 or the outer spline 54 increases the ability of these components to transmit torque payload without risk of failure. Accordingly, the increase in strength allows the robotic harmonic flex-drive assembly 52 to transmit much higher forces within the plane of inner gear teeth 60 and the outer gear teeth 62.

The robotic harmonic flex-drive assembly 52 of the present invention may utilize a single bearing, x-type bearing (i.e. four-contact point bearing) or other like bearings, including an A-type or angle contact bearing.

Figure 7A:
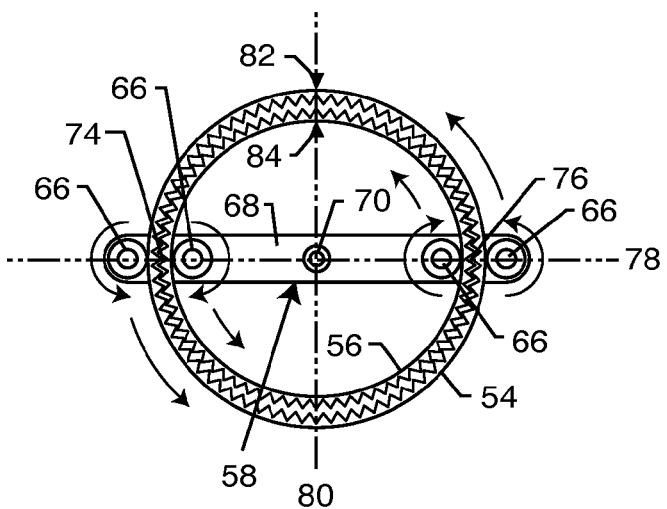
FIG. 7A is a schematic view of the robotic harmonic flex-drive of the present invention, illustrating rotational movement of the wave generator.
Figure 7B:
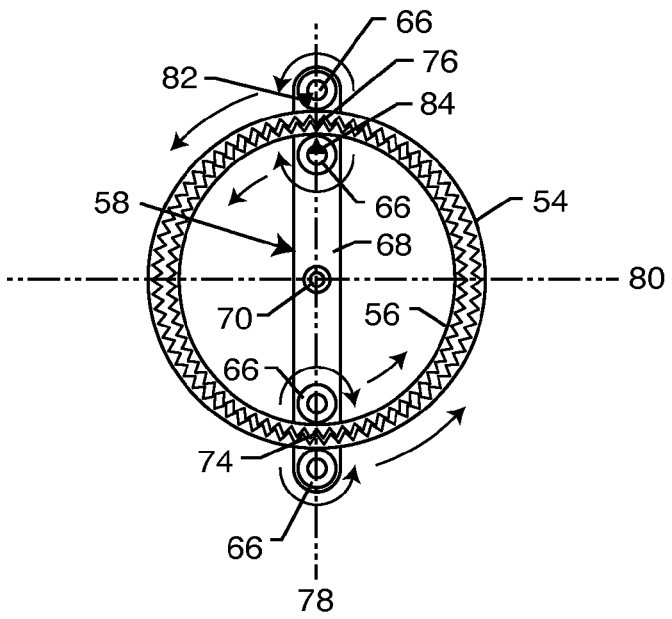
FIG. 7B is a similar schematic view of FIG. 7A, illustrating 90° clockwise rotation of the wave generator.
Figure 7C:
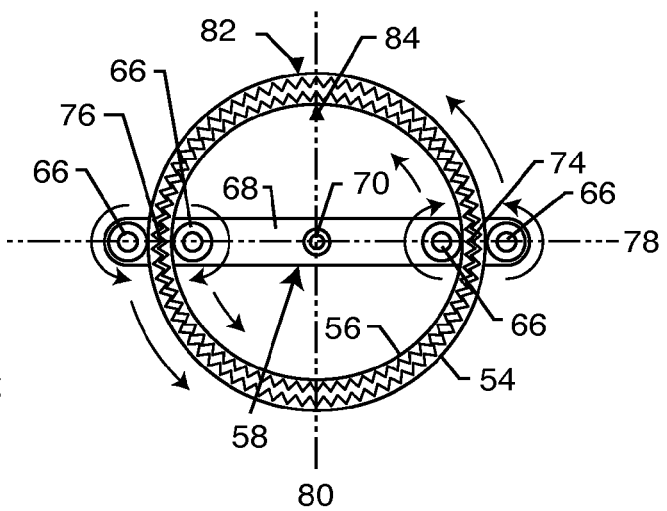
FIG. 7C is a similar schematic view of FIG. 7A, illustrating 180° clockwise rotation of the wave generator.

The robotic harmonic flex-drive assembly 52 of the present invention is a speed reduction mechanism that includes the inner spline 56 located coaxially within the outer spline 54. The splines 54, 56 are deflected into one another at the two diametrically opposed engagement points 74, 76, as best shown in FIGS. 7A-7C. The diametrically opposed engagement points 74, 76 are created by the rollers 66 on opposite ends of the wave generator bar 68. The inner gear teeth 60 of the outer spline 54 engage the outer gear teeth 62 of the inner spline 56 along a major axis 78 and are completely disengaged from one another along a minor axis 80. A drive motor (not shown) rotates the wave generator 58 counter-clockwise about the circumference of the inner spline 56 and the outer spline 54 as shown in the embodiments in FIGS. 7A-7C. The rollers 66 maintain the major axis 78 along the length of the bar 68 of the wave generator 58 during the rotational movement around the circumference of the inner spline 56 and the outer spline 54. Hence, different sections of the inner spline 56 and the outer spline 54 deform during the rotational movement of the wave generator 58 as driven by a motor via the drive shaft 70.

The change in the angular velocity of the wave generator 58 relative to the inner spline 56 results from the difference in the quantity of the inner gear teeth 60 relative to the quantity of the outer gear teeth 62. The gear ratio of the angular velocities is expressed in Equation 1 below and is commonly known as a reduction ratio because the angular velocity of the inner spline 56 is less than the angular velocity of the wave generator 58. In Equation 1, n represents the quantity of outer gear teeth 62 divided by the difference between the quantity of outer gear teeth 62 and the quantity of inner gear teeth 60.

$$n = \frac{\text{(Number of outer gear teeth)}}{\left(\begin{array}{c}\text{Number of outer gear teeth} - \\ \text{Number of inner gear teeth}\end{array}\right)}$$ (Equation 1)

In a preferred embodiment, the inner spline 56 has two fewer outer gear teeth 62 relative to the quantity of inner gear teeth 60 of the outer spline 54. For a preferred robotic harmonic flex-drive assembly 52 that has 100 outer gear teeth 62 on the inner spline 56, the outer spline 54 would have 102 inner gear teeth 60. Accordingly, the gear ratio is (100/(100−102))=−50. The fact that the gear ratio is negative indicates that the rotation of the inner spline 56 is opposite that of the rotation of the wave generator 58. A positive number indicates that the inner spline 56 rotates in the same direction as the wave generator 58.

Selection of an optimal gear tooth profile is necessary to provide smooth and efficient operation, maximum torque transmission capability, maintain a uniform elliptical shape of both the inner spline 56 and the outer spline 54 and eliminate any unwanted vibrational modes of the robotic harmonic flex-drive assembly 52. As shown in the detailed mathematical model below, the ideal tooth shape for the above-described robotic harmonic flex-drive assembly 52 does not look anything like the tooth profile used for typical spur or helical gears. The correct tooth shape is important for holding the outer spline 54 relative to the inner spline 56 in an optimal elliptical shape to prevent any undesirable deformations or waves. If the tooth face slope angle is not equal to or greater than the ideal shape, then the robotic harmonic flex-drive assembly 52 will not move. Optimal gear tooth profile will also provide an envelope, below which the gear teeth 60, 62 must be cut during manufacture to prevent the robotic harmonic flex-drive assembly 52 from locking up such that the wave generator 58 cannot turn. The optimal gear tooth profile is determined by measuring the motion of a point 82 (FIGS. 7A-7C) on the outer pitch line of the outer spline 54 relative to a corresponding reference point 84 (FIGS. 7A-7C) on the inner pitch line of the inner spline 56, as the diametrically opposed engagement points 74, 76 rotate about the circumference of the inner spline 56 and the outer spline 54. The motion of the point 82 is expressed in a Cartesian reference frame that is fixed to the inner pitch line with an origin at the inner reference point 84. The desired tooth profile above the pitch line is the locus of a point midway between the two points 82, 84. A similar model may be developed below the pitch line, if desired.

A computational procedure must be generated to create a profile with any desired accuracy since a closed form solution for the profile is not practical. A simplifying approximation is made in that the motion of the point 82 rotates in unison with the reference point 84 within the Cartesian reference frame. This approximation allows use of the same curve for both the inner and outer surfaces of the inner spline 56 and the outer spline 54, respectively. Ideally, a distinct analysis of the outer gear teeth 62 profile is determined in a Cartesian reference frame that is fixed to the outer pitch line with the origin at point 82. But, the two curves are nearly identical for the configuration parameters considered herein.

To apply the computational procedure, two system parameters must first be defined with respect to the drive radius of the pitch line at a point of engagement (r) and the gear ratio (n) of angular velocities between the inner spline 56 and the wave generator 58 (reduction ratio)—assuming a fixed inner spline 56. An example drive radius of 1.52 centimeters (cm) is used for the illustrative computation herein. To simplify the calculation, a positive reduction ratio of n=50, as similarly calculated earlier, is used for the reduction ratio. Each of these parameters are highlighted in Equations 2 and 3 below.

$$r = 1.52 \text{ cm} \quad \text{(Equation 2)}$$

$$n = 50 \quad \text{(Equation 3)}$$

For the given values of r and n in Equations 2 and 3, respectively, the pitch radius of the inside sleeve ($r_i$), the pitch radius of the outside sleeve ($r_o$), the deflection (d) required for engagement between the inner gear teeth 60 of the outer spline 54 with the outer gear teeth 62 of the inner spline 56 and the gear tooth pitch (p) are represented in Equations 4-7, respectively.

$$r_i = \frac{2rn}{(2n+1)} = 1.505 \quad \text{(Equation 4)}$$

$$r_o = \frac{2r(n+1)}{(2n+1)} = 1.535 \quad \text{(Equation 5)}$$

$$d = \frac{r}{(2n+1)} = 0.015 \quad \text{(Equation 6)}$$

$$p = \frac{2\pi r}{(2n+1)} = 0.0946 \quad \text{(Equation 7)}$$

Figure 8A:
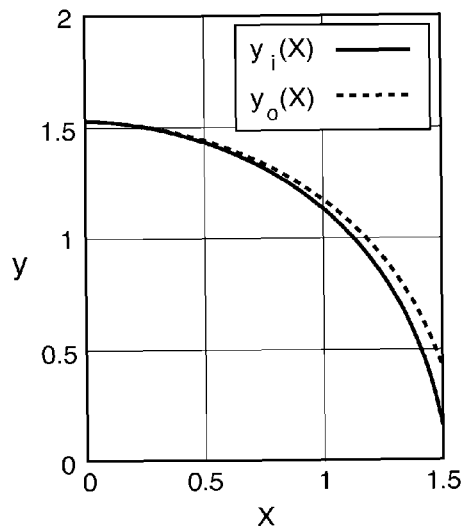
FIG. 8A is a graph illustrating relative positioning of the diameters of the outer spline relative to the inner spline.

The pitch lines of the inner spline 56 and the outer spline 54 are deformed into uniform ellipses by the wave generator 58. The points of engagement lie along the major axis 78 at the diametrically opposed engagement points 74, 76 on the outside of the inner spline 56 and the inside of the outer spline 54. The relative movement of the point 82 relative to the reference point 84 (FIGS. 7A-7C) is equivalent to holding the inner spline 56 and the outer spline 54 fixed such that the point 82 moves away from the reference point 84 along equal arc lines. Equations 8 and 9 represent the movement of the inner gear teeth 60 of the outer spline 54 away from the outer gear teeth 62 of the inner spline 56, respectively. FIG. 8A illustrates the gear tooth separation between the inner gear teeth 60 and the outer gear teeth 62 of Equations 8 and 9. Accordingly, the inner gear teeth 60 and the outer gear teeth 62 are engaged at x=0. The inner spline 56 and the outer spline 54 elliptical pitch lines are respectively represented by $y_i$ and $y_o$. FIG. 8A shows the two separations along an x-axis grid with an interval $d_x$.

$$y_i(x) = r\sqrt{1 - \left(\frac{x}{r_i - d}\right)^2} \quad \text{(Equation 8)}$$

$$y_o(x) = r\sqrt{1 - \left(\frac{x}{r_o + d}\right)^2} \quad \text{(Equation 9)}$$

Equations 10 and 11 are functions of the arc length along the inner spline 56 and the outer spline 54 ellipses between uniformly spaced points along the x-axis ($d_x$) as represented by the functions $s_i(x)$ and $s_o(x)$, respectively. Equations 10 and 11 represent a pair of points that are at equal arc lengths away from the initial point where the point 82 and the reference point 84 are aligned (FIG. 7A).

$$s_i(x) = \sqrt{(y_i(x+d_x) - y_i(x))^2 + d_x^2} \quad \text{(Equation 10)}$$

$$s_o(x) = \sqrt{(y_o(x+d_x) - y_o(x))^2 + d_x^2} \quad \text{(Equation 11)}$$

Figure 8B:
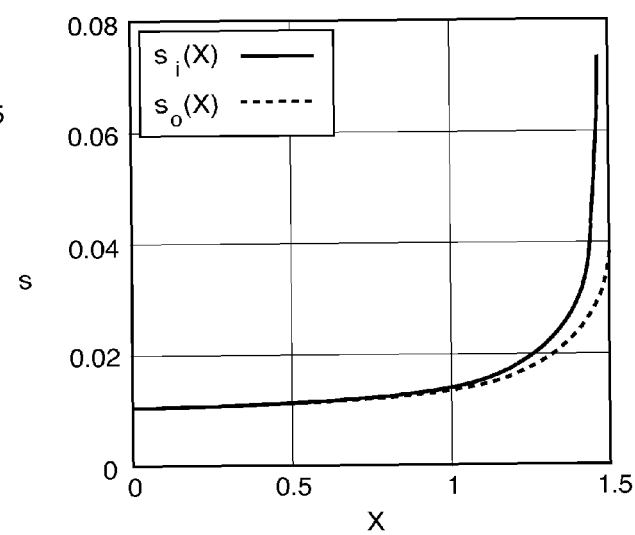
FIG. 8B is a graph illustrating arc segment lengths of the outer spline and the inner spline.
Figure 8C:
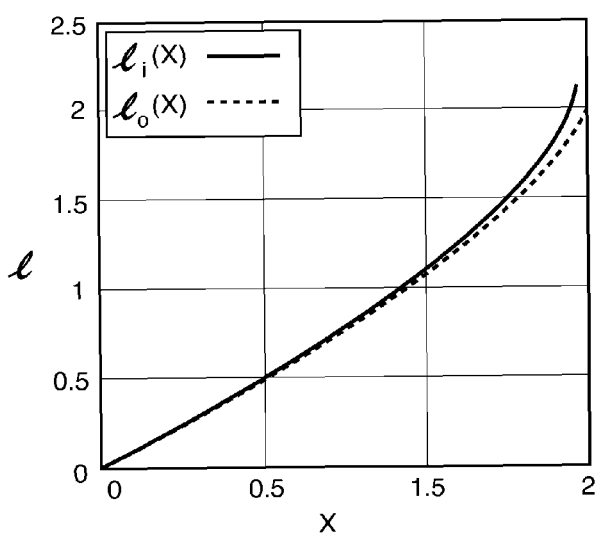
FIG. 8C is a graph illustrating total arc lengths of the outer spline and the inner spline.

Equations 12 and 13 calculate the accumulated arc length along the ellipses of the inner spline 56 and the outer spline 54 up to the x-axis points. The integrals for $l_i(x)$ and $l_o(x)$, in Equations 12 and 13 respectively, are the cumulative arc lengths to the points along the x-axis as calculated in Equations 10 and 11. As shown in FIG. 8B, the arc length difference between the inner spline 56 and the outer spline 54 significantly increases toward the minor axis 80. Not surprisingly, the inner gear teeth 60 of the outer spline 54 and the outer gear teeth 62 of the inner spline 56 are completely disengaged along the minor axis 80. The total arc length distance of Equations 12 and 13 is illustrated in FIG. 8C.

$$l_i(x) = \int_o^x \frac{s_i(v)}{dx} dv \quad \text{(Equation 12)}$$

$$l_o(x) = \int_o^x \frac{s_o(v)}{dx} dv \quad \text{(Equation 13)}$$

Figure 8D:
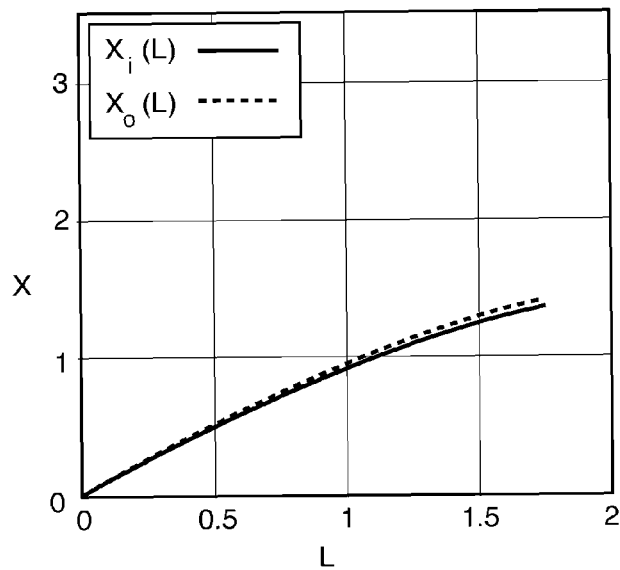
FIG. 8D is a graph illustrating the x coordinates for the outer spline and the inner spline for a predetermined arc length.
Figure 8E:
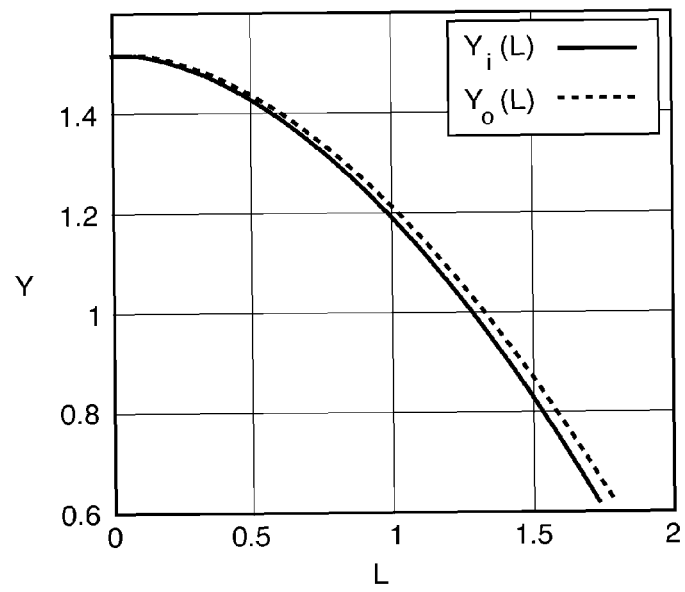
FIG. 8E is a graph illustrating the y coordinate for a given arc length.

The pitch lines of the inner spline 56 ($p_i$) and the outer spline 54 ($p_o$) coincide with the diametrically opposed engagement points 74, 76 that lie on the major axis 78 of the wave generator 58. The pitch lines $p_i$ and $p_o$ are always at equal arc length distances from the diametrically opposed engagement points 74, 76. But, the grid points from the calculations above, as shown in FIGS. 8B and 8C, show that there are clearly different arc lengths along the x-axis. Therefore, the arc length L is introduced as an independent variable to precisely locate the point pairs at specific arc lengths along the respective pitch lines $p_i$ and $p_o$. Accordingly, Equations 14 and 15 provide the x-coordinates of points at specified arc lengths along the $y_i$ and $y_o$ curves as a function of $x_i$ and $x_o$, respectively. This occurs after solving for the x-coordinates associated with the independent arc length L. The y-coordinates $y_i$ and $y_o$ are then readily obtained from x. The functions $X_i(L)$ and $X_o(L)$ solve the functions $l_i(x)$ and $l_o(x)$ for the x coordinate of a point at arc length L from the point of engagement along the inner and outer ellipses, respectively. FIGS. 8D and 8E illustrate the x-coordinates and the y-coordinates, respectively, of the inner spline 56 and the outer spline 54 along arc length L.

$$X_i(L) = x \text{ where } l_i(x) = L \quad \text{(Equation 14)}$$

$$X_o(L) = x \text{ where } l_o(x) = L \quad \text{(Equation 15)}$$

$$Y_i(L)=y_i(X_i(L)) \quad \text{(Equation 16)}$$

$$Y_o(L)=y_o(X_o(L)) \quad \text{(Equation 17)}$$

The coordinates $X_i(L)$ and $Y_i(L)$ define the vector location of the point $p_i(L)$, Equation 18, at arc length L on the inner spline 56 ellipse and similarly for $p_o(L)$, Equation 19, on the outer spline 54 ellipse.

$$p_i(L)=[X_i(L),Y_i(L)] \quad \text{(Equation 18)}$$

$$p_o(L)=[X_o(L),Y_o(L)] \quad \text{(Equation 19)}$$

Figure 8F:
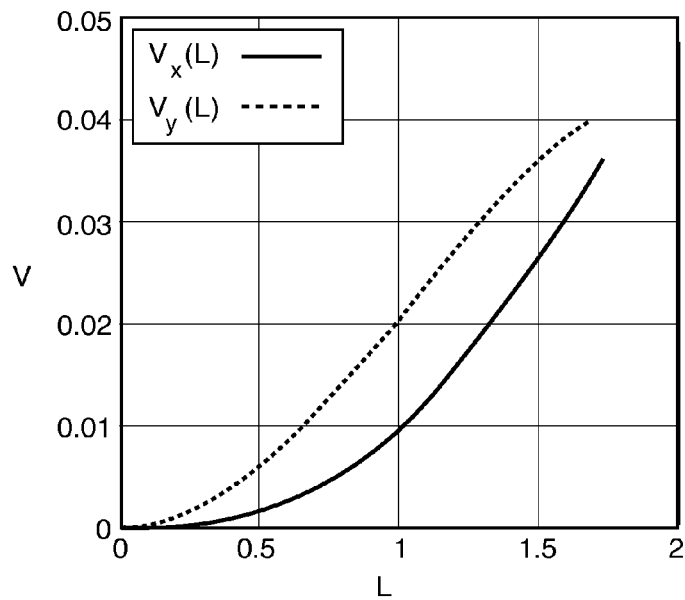
FIG. 8F is a graph illustrating the x coordinate and y coordinate component of the relative pitch points of the outer spline and the inner spline.

The vector difference $V(L)$ of Equation 20 defines the motion of $p_o(L)$ relative to $p_i(L)$, expressed in a fixed reference frame, as shown in the graph of FIG. 8F.

$$V(L)=[X_o(L)-X_i(L),Y_o(L)-Y_i(L)] \quad \text{(Equation 20)}$$

Tooth shape determination requires that the vector $V(L)$ be expressed in a reference frame rotating with the tangent to the $y_i$ curve. The rotation angle $\theta(L)$ is calculated from $X_i(L)$ and $Y_i(L)$ with the differencing technique of Equation 21.

$$\theta(L) = \arctan\left(\frac{Y_i(L)\mathrm{d}L - Y_i(L)}{X_i(L)\mathrm{d}L - X_i(L)}\right) \quad \text{(Equation 21)}$$

Transforming $V(L)$ into $V_R(L)$ in the rotated reference frame is constructed from $\theta(L)$ and is shown in Equation 22.

$$R(L) = \begin{bmatrix} \cos(\theta(L)) - \sin(\theta(L)) \\ \sin(\theta(L)) + \cos(\theta(L)) \end{bmatrix} \quad \text{(Equation 22)}$$

Figure 8G:
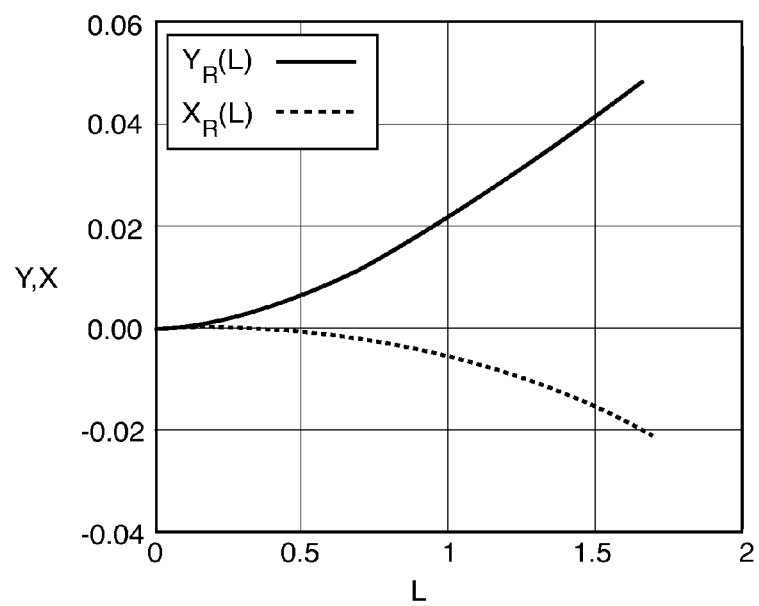
FIG. 8G is a graph illustrating the x and y components of the vector mid point between the pitch of the outer spline and the inner spline.

The x and y components of $V_R(L)$ are expressed generally in Equation 23 and shown in FIG. 8G.

$$V_R(L) = \frac{1}{2}R(L)V(L) \quad \text{(Equation 23)}$$

Figure 8H:
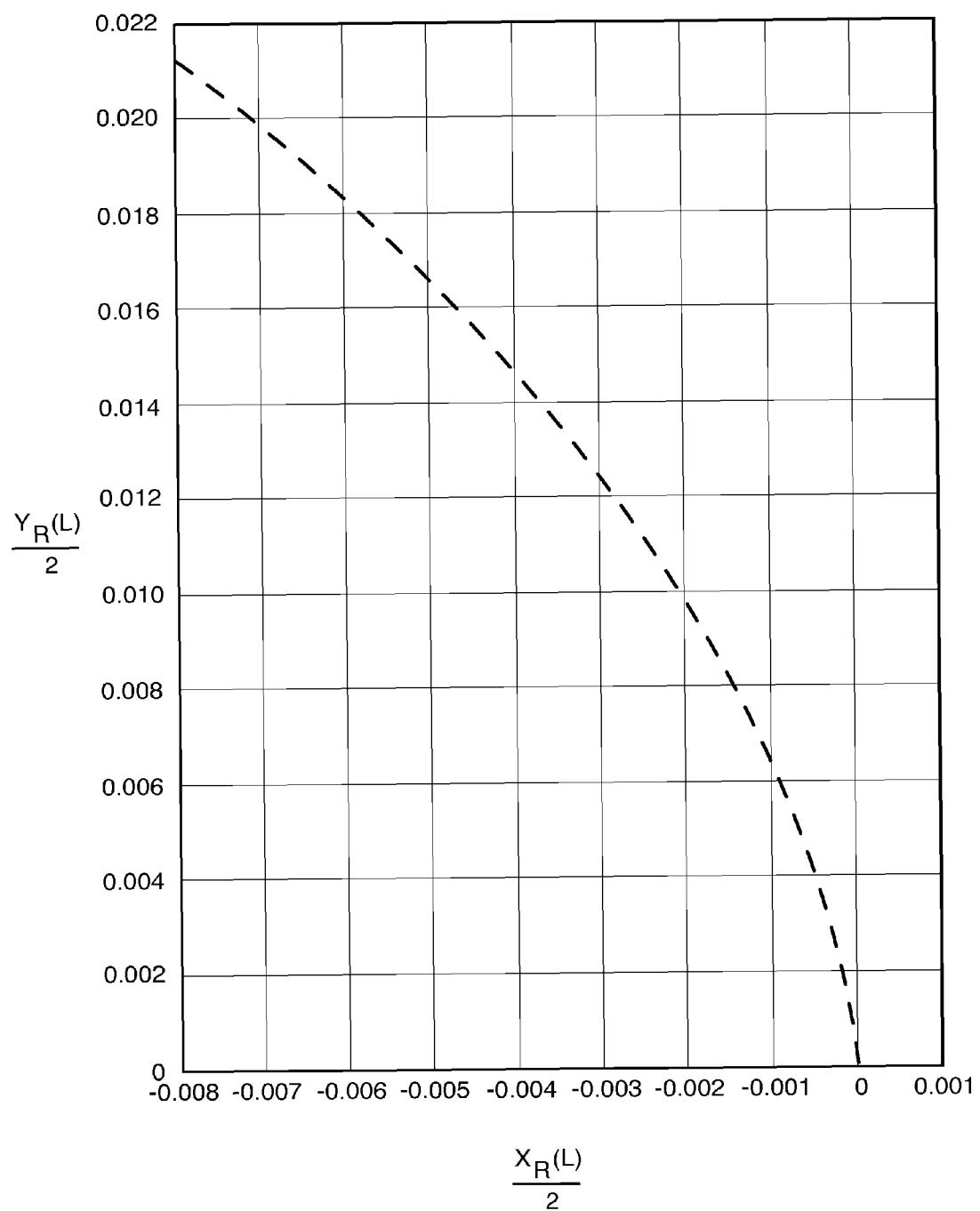
FIG. 8H is a graph illustrating the curve of desired tooth profile.

The end result of the tooth profile determination process is obtained by dividing $V_R(L)$ by 2 to obtain the vector midpoint between $p_o$ and $p_i$. The preferred profile curve $V_R(L)/2$ of this example is illustrated in the graph of FIG. 8H.

Although an embodiment has been described in detail for purposes of illustration, various modifications may be made without departing from the scope and spirit of the invention.

What is claimed is:

1. A robotic harmonic flex-drive, comprising:
   a first generally cylindrical spline having inner diameter gear teeth;
   a second generally cylindrical spline concentric to the first spline and having outer diameter gear teeth; and
   a wave generator comprising a pair of rollers disposed adjacent to an outer surface of the first spline and an inner surface of the second spline, wherein the rollers deform the second splines into ellipse whereby the inner diameter gear teeth of the first spline engage the outer diameter gear teeth of the second spline.

2. The robotic harmonic flex-drive of claim 1, wherein the inner diameter gear teeth contact the outer diameter gear teeth at a pair of diametrically opposed points.

3. The robotic harmonic flex-drive of claim 2, wherein the inner diameter gear teeth contact the outer diameter gear teeth along a major axis of the deformed first and second splines.

4. The robotic harmonic flex-drive of claim 1, wherein a ratio of outer diameter gear teeth to inner diameter gear teeth determines an angular rotational speed of the second spline relative to an angular rotational speed of the wave generator.

5. The robotic harmonic flex-drive of claim 4, wherein the outer diameter gear teeth outnumber the inner diameter gear teeth such that the angular rotational speed of the second spline is relatively slower than the angular rotational speed of the wave generator.

6. The robotic harmonic flex-drive of claim 1, wherein the wave generator includes a second pair of rollers disposed adjacent to an outside surface of the first spline and an inner surface of the second spline.

7. The robotic harmonic flex-drive of claim 1, including a motor for rotating the wave generator.

8. The robotic harmonic flex-drive of claim 1, wherein the inner diameter gear teeth and the outer diameter gear teeth are disengaged along a minor axis of the deformed first and second splines.

9. The robotic harmonic flex-drive of claim 1, wherein the first spline is stationary.

10. A robotic harmonic flex-drive, comprising:
    a first generally cylindrical spline having inner diameter gear teeth;
    a second generally cylindrical spline concentric to the first spline and having outer diameter gear teeth; and
    a wave generator comprising a pair of rollers disposed adjacent to an outer surface of the first spline and an inner surface of the second spline, wherein the rollers deform the second splines into ellipse whereby the inner diameter gear teeth of the first spline engage the outer diameter gear teeth of the second spline along a major axis of the deformed first and second splines.

11. The robotic harmonic flex-drive of claim 10, wherein the outer diameter gear teeth outnumber the inner diameter gear teeth such that the angular rotational speed of the second spline is relatively slower than the angular rotational speed of the wave generator.

12. The robotic harmonic flex-drive of claim 10, wherein the wave generator includes a second pair of rollers disposed adjacent to an outside surface of the first spline and an inner surface of the second spline.

13. The robotic harmonic flex-drive of claim 10, including a motor for rotating the wave generator.

14. The robotic harmonic flex drive of claim 10, wherein the inner diameter gear teeth and the outer diameter gear teeth are disengaged along a minor axis of the deformed first and second splines.

15. The robotic harmonic flex-drive of claim 10, wherein the first spline is stationary.

16. A robotic harmonic flex-drive, comprising:
    a first generally cylindrical spline having inner diameter gear teeth;
    a second generally cylindrical spline concentric to the first spline and having outer diameter gear teeth; and
    a wave generator comprising a pair of rollers disposed adjacent to an outer surface of the first spline and an inner surface of the second spline, wherein the rollers deform the second splines into ellipse whereby the inner diameter gear teeth of the first spline engage the outer diameter gear teeth of the second spline at a pair of diametrically opposed points; and
    wherein a ratio of outer diameter gear teeth to inner diameter gear teeth determines an angular rotational speed of the second spline relative to an angular rotational speed of the wave generator.

17. The robotic harmonic flex-drive of claim 16, wherein the inner diameter gear teeth contact the outer diameter gear teeth along a major axis of the deformed first and second splines.

18. The robotic harmonic flex-drive of claim 16, wherein the outer diameter gear teeth outnumber the inner diameter gear teeth such that the angular rotational speed of the second spline is relatively slower than the angular rotational speed of the wave generator.

19. The robotic harmonic flex-drive of claim 16, wherein the wave generator includes a second pair of rollers disposed adjacent to an outside surface of the first spline and an inner surface of the second spline and a motor for rotating the wave generator, wherein the inner diameter gear teeth and the outer diameter gear teeth are disengaged along a minor axis of the deformed first and second splines.

20. The robotic harmonic flex-drive of claim 16, wherein the first spline is stationary.

* * * * *

UNITED STATES PATENT AND TRADEMARK OFFICE
CERTIFICATE OF CORRECTION

| | | |
|---|---|---|
| PATENT NO. | : 7,891,272 B2 | Page 1 of 1 |
| APPLICATION NO. | : 11/940170 | |
| DATED | : February 22, 2011 | |
| INVENTOR(S) | : William J. Schonlau | |

It is certified that error appears in the above-identified patent and that said Letters Patent is hereby corrected as shown below:

In column 9, line 57 (claim 1), replace "splines into ellipse" with --spline into an ellipse--.

In column 10, line 29 (claim 10), replace "splines into ellipse" with --spline into an ellipse--.

In column 10, line 60 (claim 16), replace "splines into ellipse" with --spline into an ellipse--.

Signed and Sealed this
Seventh Day of June, 2011

David J. Kappos
*Director of the United States Patent and Trademark Office*